P. T. HÄNEL.
POT PRESS ESPECIALLY ADAPTED FOR THE EXTRACTION OF CACAO BUTTER OR CACAO OIL.
APPLICATION FILED APR. 10, 1914.
1,162,353.
Patented Nov. 30, 1915.
6 SHEETS—SHEET 2.
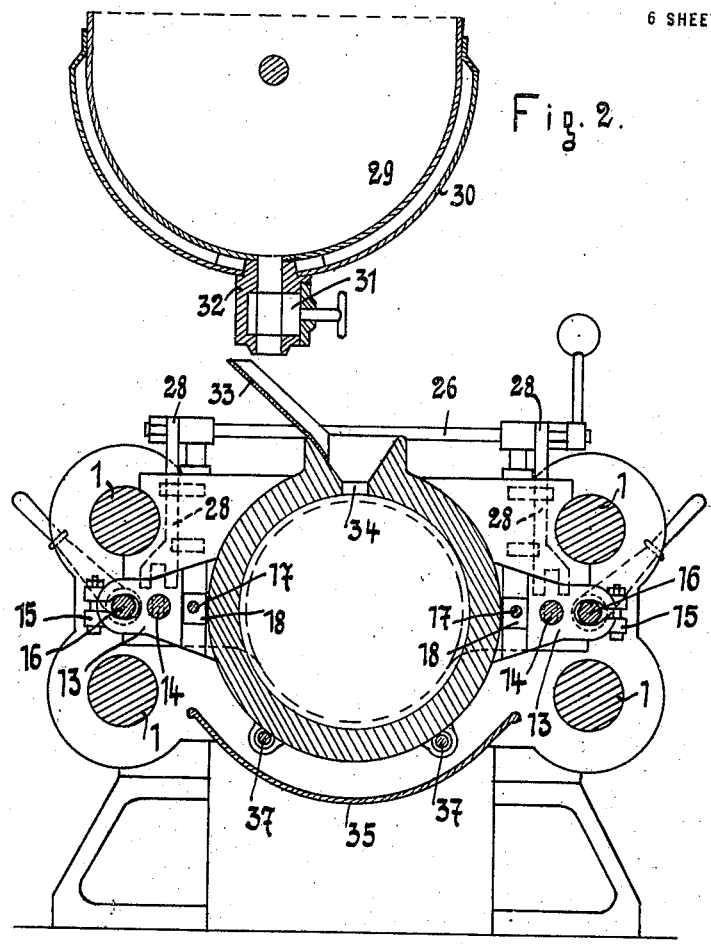
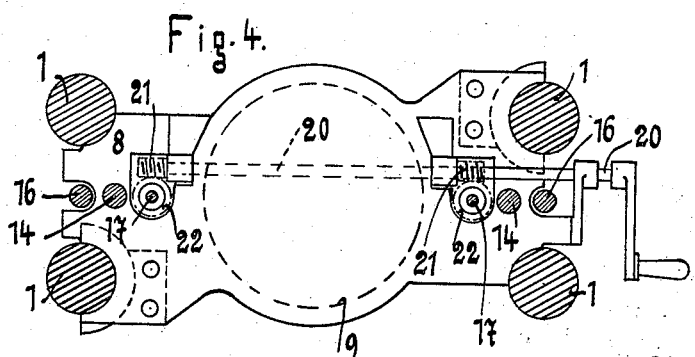

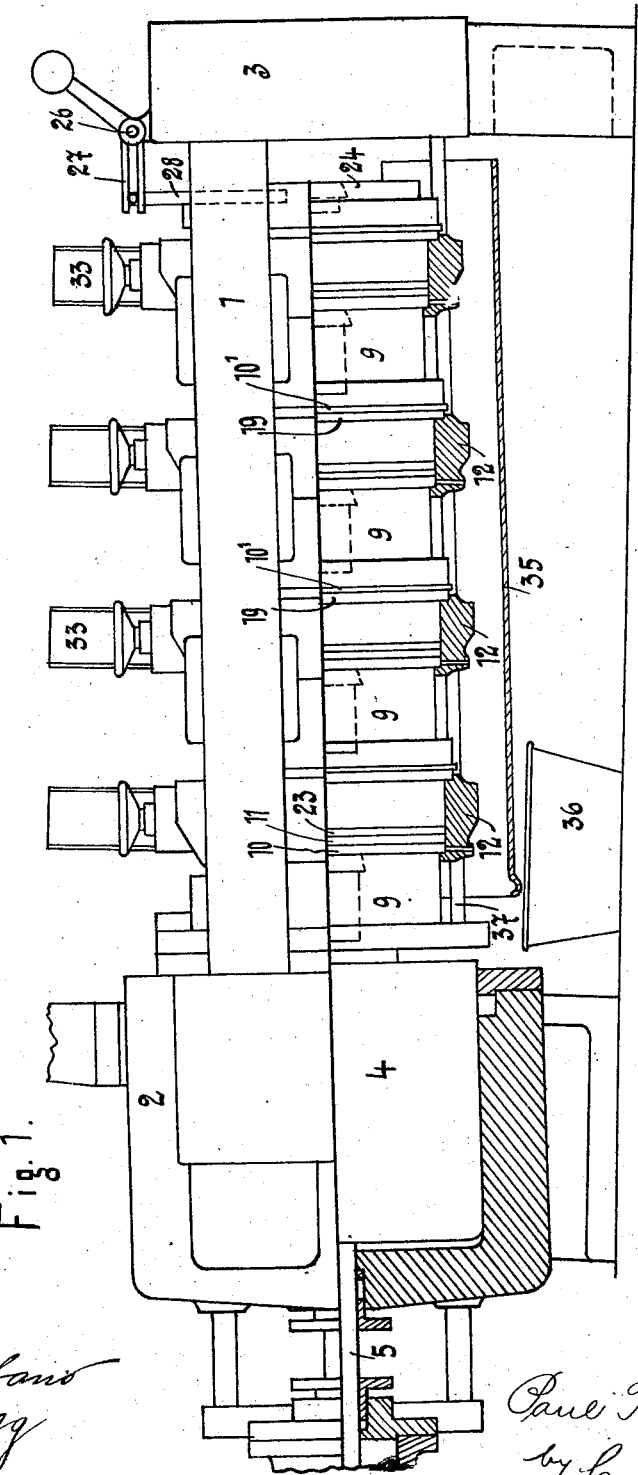

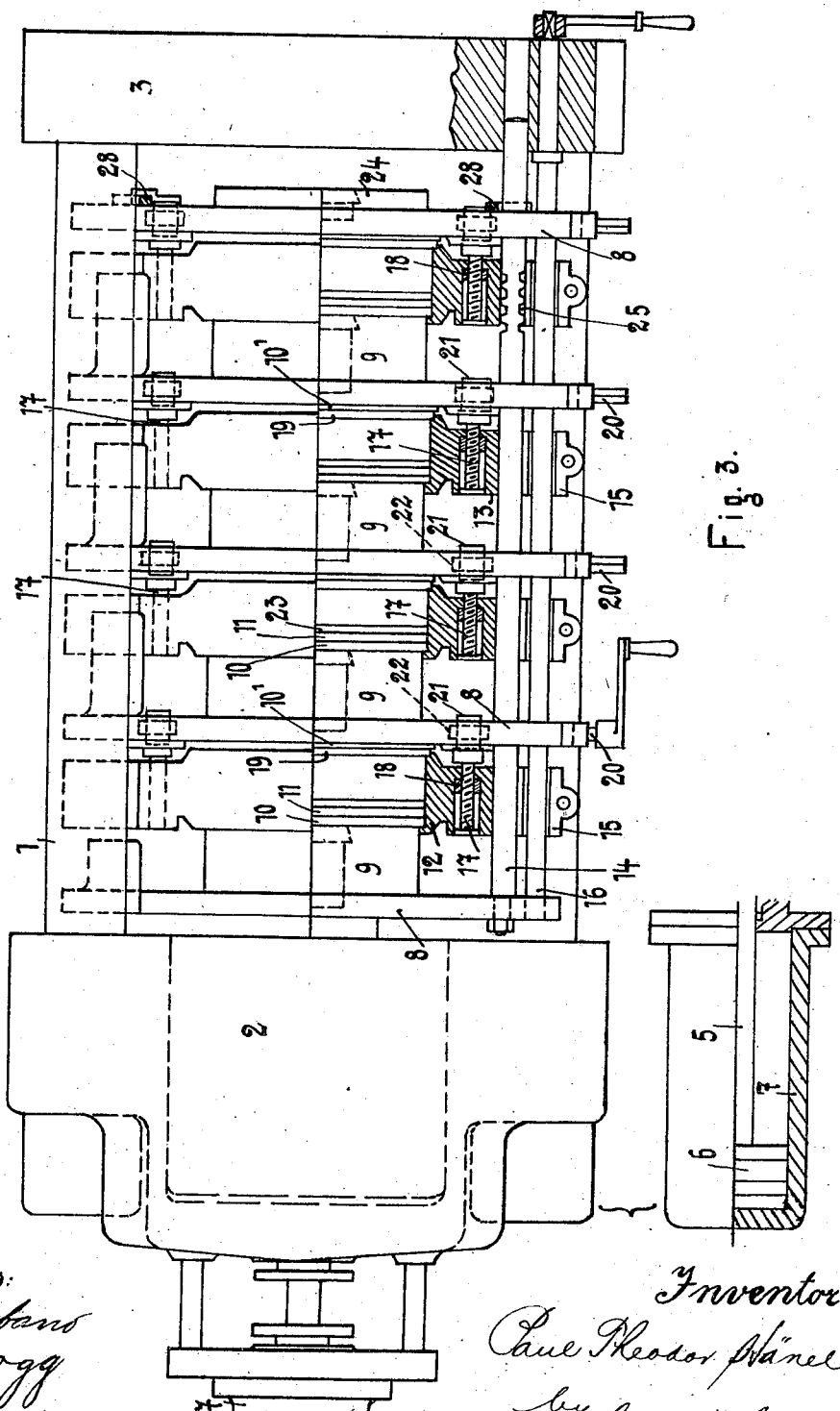

P. T. HÄNEL.
POT PRESS ESPECIALLY ADAPTED FOR THE EXTRACTION OF CACAO BUTTER OR CACAO OIL.
APPLICATION FILED APR. 10, 1914.
1,162,353.
Patented Nov. 30, 1915.
6 SHEETS—SHEET 4.
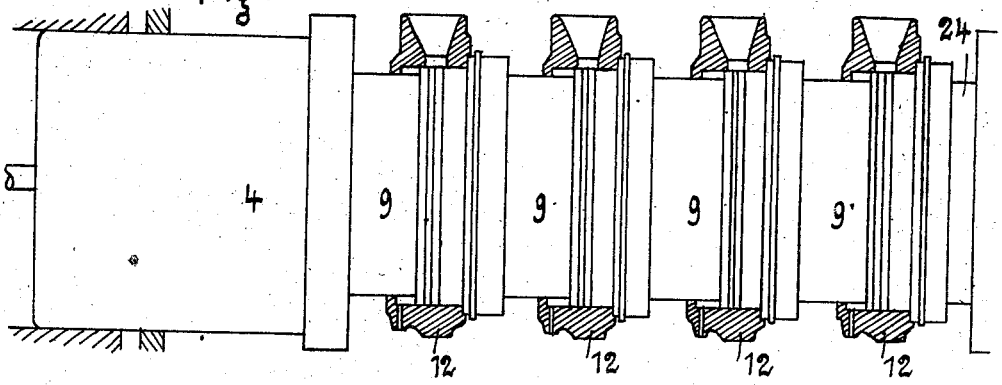
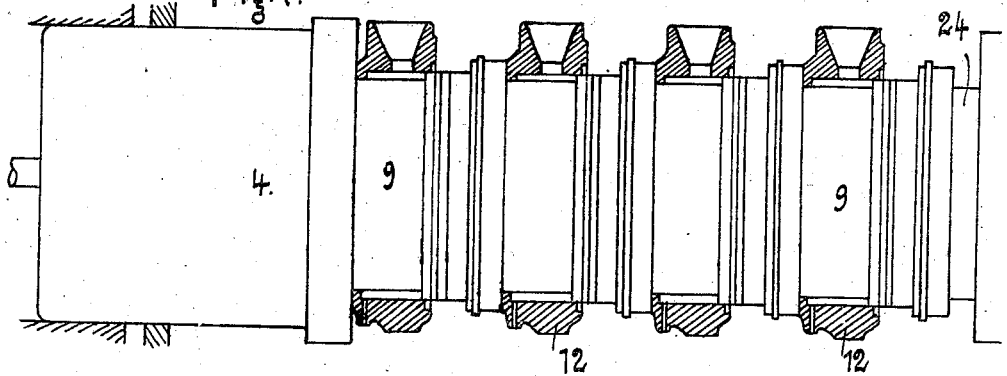
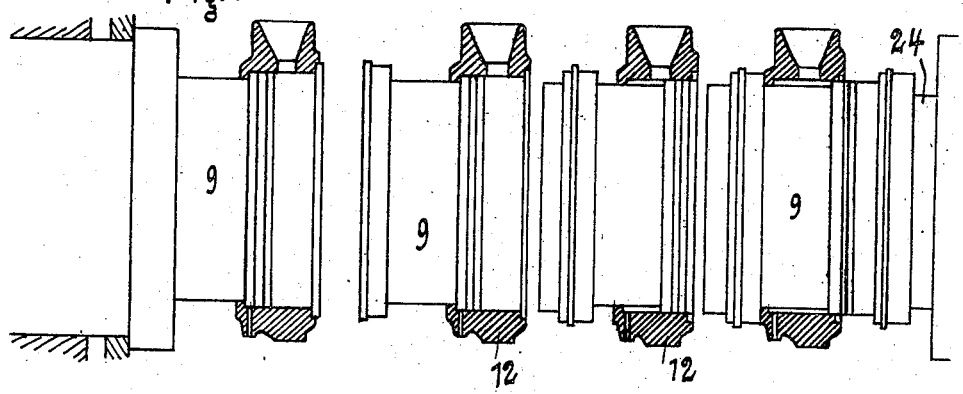

P. T. HÄNEL.
POT PRESS ESPECIALLY ADAPTED FOR THE EXTRACTION OF CACAO BUTTER OR CACAO OIL.
APPLICATION FILED APR. 10, 1914.
1,162,353.
Patented Nov. 30, 1915.
6 SHEETS—SHEET 5.
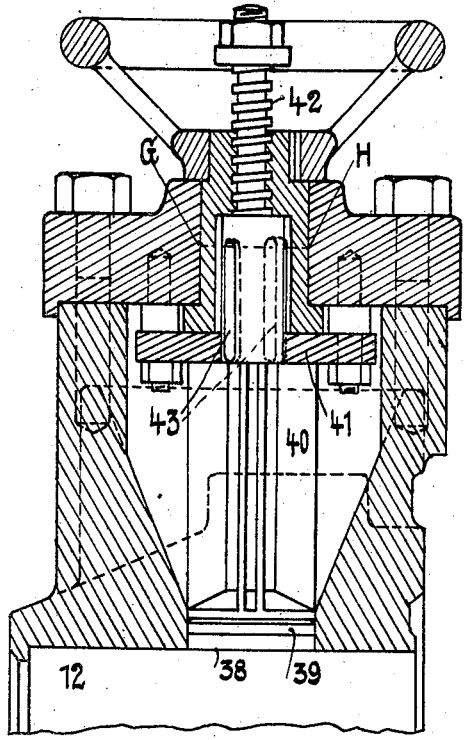
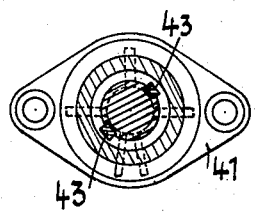
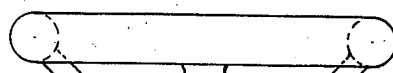
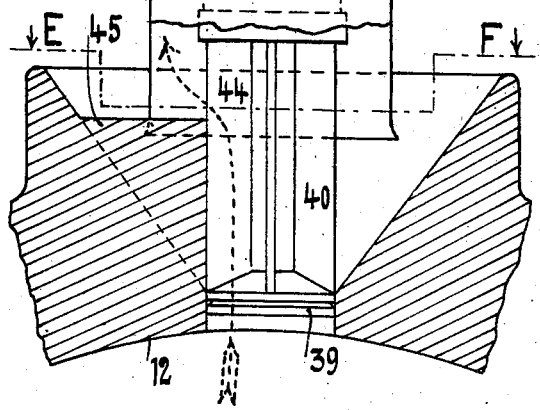

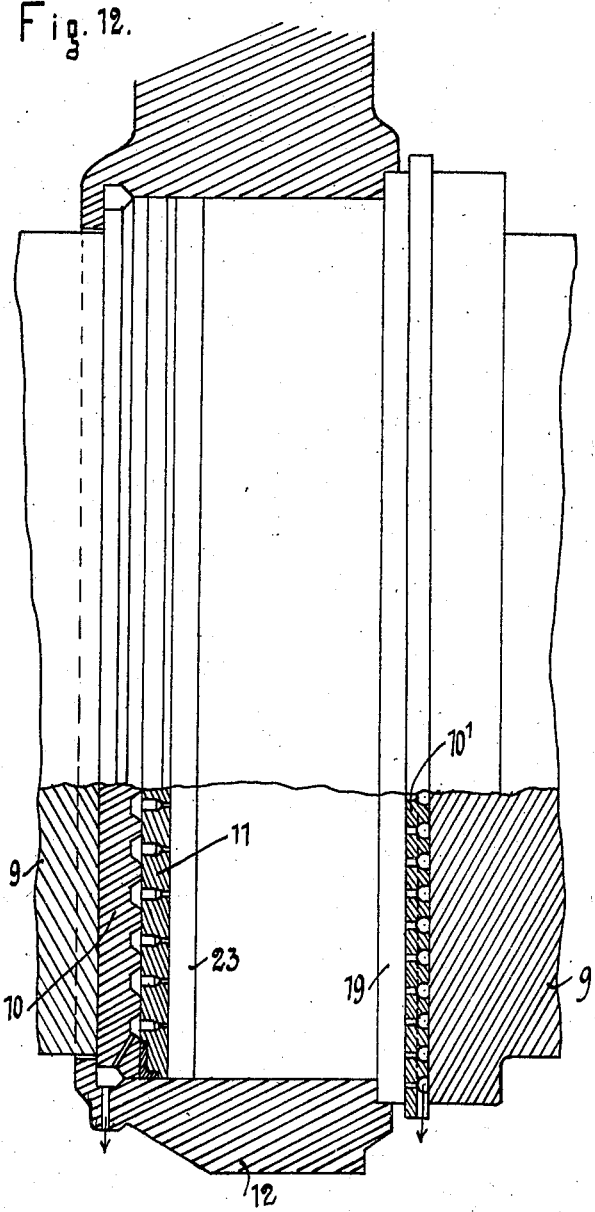

UNITED STATES PATENT OFFICE.

PAUL THEODOR HÄNEL, OF DRESDEN, GERMANY, ASSIGNOR TO LOUIS BERNHARD LEHMANN, OF DRESDEN, GERMANY.

POT-PRESS ESPECIALLY ADAPTED FOR THE EXTRACTION OF CACAO-BUTTER OR CACAO-OIL.

1,162,353.    Specification of Letters Patent.    Patented Nov. 30, 1915.

Application filed April 10, 1914. Serial No. 830,908.

*To all whom it may concern:*

Be it known that I, PAUL THEODOR HÄNEL, a citizen of the Kingdom of Saxony, and residing at Dresden, in the German Empire, have invented new and useful Improvements in Pot-Presses Especially Adapted for the Extraction of Cacao-Butter or Cacao-Oil, of which the following is a specification.

According to the present invention, a hydraulic cacao-press of recumbent arrangement has been produced, which retains the satisfactory elements and the satisfactory method of working of the pot-press and makes possible the recumbent arrangement primarily through direct radial charging of the individual hollow bodies by means of lateral filling-openings provided with valves. As the openings for filling, which are naturally suitably disposed at the upper vertex of the hollow recumbent bodies, can be directly filled from a heated reservoir having stirring apparatus and lying above the press, the charging of the recumbent pot-press is much more easy than that of the vertical press, in which the pots must be individually filled and then be brought to their place. With the direct filling of the individual hollow bodies from without, all the difficulties of the recumbent pot-press disappear, which difficulties arose in the previously known recumbent press out of the axial supply from the interior, and one receives from each of the completely separated charges of the single hollow bodies, completely separated simple disk-shaped press-cakes. A further necessary feature to be considered exists therein that these separated disk-shaped press-cakes must be brought out of the press in the most simple and time-saving manner and, as far as it is in any manner possible, by means of mechanical ways. For this purpose the press-stamp is made, first of all, so long that it may pass completely through the hollow body and so can push the press-cakes out of the hollow body by means of its further forward movement. In order to obtain this pushing out with all the elements simultaneously, in a mechanical manner, the corresponding mechanical arrangements are so made that the entire column is first pushed forward in an empty space, until after the striking off its end against the abutment, whereupon the pressing follows, thereafter to withdraw again the shortened column somewhat, and then fasten the hollow bodies to their places, and finally through renewed advances of the hydraulic piston cause the simultaneous pushing out of the press-cakes.

In the accompanying drawings, Figure 1 is an elevation, with a partial longitudinal section, Fig. 2 is a vertical cross-section, Fig. 3 is a plan-view, with a partial longitudinal section, Fig. 4 is a front-view of a press-stamp in cross-section looking through the parts lying longitudinally, Figs. 5 to 7 represent the columns of the elements in longitudinal section, Fig. 5 showing the condition when making ready before the charging, Fig. 6, the condition of the completed pressing, and Fig. 7, the condition after the pushing out of the press-cakes out of the hollow bodies, Figs. 8 to 11 show one embodiment of the filling-valves, and Figs. 8 and 11 show sections along lines A—B and C—D respectively of Fig. 10. Fig. 10 is a plan-view with cross-section along the line E—F of Fig. 11, while Fig. 9 is a section along line G—H of Fig. 8. Finally, in Fig. 12 is shown a pair of elements in longitudinal section.

Similar reference characters indicate corresponding parts throughout the different figures of the drawings.

Referring to the drawings, it will be seen that the press, whose axis lies suitably somewhat inclined, for the running off of the pressed out cacao-butter and for the more easy insertion of the filter-plates, consists of two strong head-pieces 2 and 3 united by an iron bar 1, the first of which head-pieces forms the working cylinder for the hydraulic piston 4. With this piston is coupled, by means of a piston-rod 5, a smaller auxiliary piston 6 which moves in the cylinder 7, and which, for the purpose of saving time, performs the initial pushing forward of the column in the empty space or path of free movement, the drawing back of the column after the pressing, the renewed driving forward of the column in the pushing out of the press-cakes, and the final drawing back of the column in the position according to Fig. 5. The main piston 4 thus has only the performance of the real pressing work.

On the bar 1 the press-stamps 9 are guided with the plates 8, clearly shown in Fig. 4, and which press-stamps 9 or pressure-heads are hollow bodies suitably cast and heated by steam, which are shut off by means of plates 10 and 11. The plates 11 are, as shown in Fig. 12, sieve-plates with borings widening from within, while the plates 10 contain a canal system, visible in Fig. 12, for the leading away of the cacao-butter. Also the left end-surfaces of the press-stamps are overlaid with plates 10', which are sie.e-plates, and are also provided with a canal system for leading away the fat, in the same manner like the plates 10. The press-stamps, as also the plates 10 and 11, are of such a length that they can completely reach through the hollow bodies (see Fig. 7). The first press-stamp 9, which is found next to the piston 4, is united with the piston.

The ring-shaped hollow bodies 12 (pots) lying between two press-stamps 9 extend with their lateral extensions 13 to the rods 14 which are, on the one hand, fastened to the plate 8 of the first press-stamp, and, on the other hand, are shiftable in the head-piece 3 and clasp the rods 16 by means of slotted eyes 15 adjustable by screws, which rods 16 are revoluble in the head-piece 3 and on which the plates 8 may be freely shifted. The rods 16 have an elliptical cross-section, with a small difference between short and long axes. This cross-section shape also corresponds to the boring of the eyes 15. If the long axes of both elliptical profiles come together the hollow bodies are freely shiftable on the rods 16, whereas a turning of the rods 16 causes a firm gripping.

By means of the revoluble screws 17 in the plates 8 and the unrevoluble nuts 18 in the borings of the forward continuations 13, every hollow body can be closely pressed against the next following press-stamp, with the interposition of a filter-plate 19. The simultaneous tightening and loosening of the two screws 17 which form a pair of elements, follows through an obliquely-placed shaft 20, which by means of a worm 21 engages the worm-gear wheel 22.

A second filter-plate 23, which has such a diameter that it can only be brought into the hollow body by means of some force, lies on the plate 11. With the last hollow body (at the left), instead of a press-stamp, a closing plate 24 operates therewith. In order to couple the shortened column by means of the plate 24 with the rods 14 on the drawing back, the rods 14 are provided with grooves 25 in that region in which, depending on the filling and degree of compression at the end of the pressing, the plate 24 finds itself, in which grooves a movable connector 28 can grasp, which connectors 28 are guided on the plate 24 and are movable by means of the obliquely-inclined shaft 26, which is provided with the forked lever-arms 27.

Above the press the container 29 is provided with a heating mantle 30, and with a stirring means, which is not shown in the drawings, from which the cacao mass is led through the exit-passages 32 and the conducting grooves 33, closed by the valve 31, to the filling-openings 34 arranged on the vertex of the hollow bodies. The filling-openings are capable of being closed by valves hereinafter to be described.

After the removal of the press-cake from the first element and the insertion of the filter-plates 19 and 23, the column built up by the elements is in the condition shown in Fig. 5. Heretofore, in order to render this condition possible, the nuts 18 were screwed back on the screws 17 to the left. For making ready for the filling, the nuts first enter into the bottom of the borings in the forward extensions 13 (after the successive taking out of the press-cakes), and thereby firmly and tightly draw the following press-stamp to the hollow body lying before it. This takes place successively, as the insertion of the filter-plates and the drawing of the press-stamps to the left begins, whereby the following pair of elements are thereby drawn after it by means of their screws, respectively, so that the plates 10 and 11 grip the drawn-in periphery on the right opening of every hollow body. As the above-mentioned procedure continues, that is, the next press-cake is taken out; new filter-plates are inserted and the press-stamp is drawn, the column is brought to a condition which is shown in Figs. 1 and 3. In this condition the filling follows, whereby the successive letting in of the charge can begin as soon as the first pair of elements is ready. Now follows the employment of the hydraulic press. First, in order to save time, the auxiliary piston 6 is allowed to work, which pushes the columns forward in the empty path or path of free movement (in every case with the pressure needed for the inertia and frictional resistance), until the closing plate 24 is laid against the head-piece 3. Thereupon the main piston 4 is thrown into engagement and this causes through the self-shortening of the columns the pressing under a pressure of from 150 to 400 atmospheres (measured on the manometer of the force-pump). The fat is pressed out through the sieve-plates 11 and through the canals in the plates 10 and 10' and runs out on the low-lying edges, respectively through the openings in the hollow bodies, visible in Fig. 1, to be gathered up by the pipe 35 and conducted to a collecting container 36. After the complete pressing, the condition of the column is that shown in Fig. 6. Thereupon the connector 28 is allowed to grasp the grooves 25, and the completed shortened columns can now be drawn back a little in order to gain room for the forward push of the stamps for the purpose of pushing out the press-cakes. Now the nuts 18 are screwed back on common screws 17, and the hollow bodies are fastened to their present position by turning the rod 16. If now, after the lifting out of the connector 28, the members of the column that have remained movable, that is, the press-stamp with the press-cakes lying therebetween, are pushed through the stationary hollow bodies, the representation shown in Fig. 7 appears. The press-cakes have come out of the hollow bodies and are suspended in the air, together with the filter-plates gripped by the stamps. Now after the removal of the gripping of the hollow bodies (turning back of the rod 16), the shortened column can be withdrawn by means of the auxiliary piston, whereby the condition of egress (Fig. 5) again steps in. As soon as the press-cakes, to which the filter-plates grip, fall from the sieve-plates, they fall on the rods 37, and besides they can be easily removed by hand.

In filling, care must naturally be taken that the air can go out of the hollow bodies 8. The filling-openings 34 can be closed by simple screw-corks. The valve arrangement, shown in Figs. 8 to 11, is better, whereby the removal of the air is taken care of during the filling. The real valve consists of cylindrical disk 38, well fitted to the bore of the filling-opening, in whose periphery a packing ring is suitably placed. An oblique surface on the upper edge of the packing ring allows it to be pressed together, when the valve sunk in the hollow body 12 during the filling is again raised in the position shown in the drawings for the purposes of shutting it off. This higher placing is accurately limited, in that the cross of ribs 40 of the valve is drawn against the bridge 41 by means of the spindle 42. The valve, which is led by the non-revoluble spring-wedge 43, was in this position at the turning off of the hollow body 12, so that the lower side of the valve-disk was turned off with it in the manner visible in Fig. 11, and then went precisely flush with the cylindrical wall-surfaces of the hollow body. One of the ribs is built up as a double rib 44—44 and glides up and down on the bridge 45 cast within the filling-pipe, so that both individual ribs together with the head-side of the bridge create a canal. Through this canal the air can leave the hollow body during the filling through the path shown in Fig. 5, by means of the dotted arrow.

I have shown an embodiment of my invention, but changes may be made therein without departing from the spirit of the same as defined in the appended claims, and the cacao press may be used for any similar purpose.

I claim:

1. In a hydraulic cacao-press, ring-shaped hollow bodies for containing the charge of cacao, stamps operating in said hollow bodies to compress the cacao, openings in said hollow bodies to admit the cacao, and means for moving said stamps relatively to said hollow bodies after the compression has taken place, said stamps being of sufficient length with respect to said hollow bodies to completely push the compressed cakes out of said hollow bodies.

2. In a hydraulic cacao-press, a series of movable ring-shaped bodies for holding the charge of cacao, and located along a common axis, a series of movable stamps intermediate said hollow bodies, openings in said hollow bodies for filling them, means for closing said openings, means for connecting and disconnecting said hollow bodies to and from said stamps, said hollow bodies when connected to said stamps being tightly pressed against them, whereby said hollow bodies and said stamps form a column, a mechanism for actuating said stamps relatively to said hollow bodies to compress the cacao, and means for maintaining said hollow bodies stationary, whereby, when said stamps are disconnected from said hollow bodies and actuated while said hollow bodies are maintained stationary, the contents of said hollow bodies are bodily ejected therefrom.

3. In a hydraulic cacao-press, the combination of a series of movable ring-shaped bodies for holding the charge of cacao, openings in said hollow bodies for filling them, means for closing said openings, a series of movable stamps intermediate said hollow bodies, means for actuating said stamps, means for connecting and disconnecting said stamps to and from their adjacent hollow bodies, said stamps being tightly pressed against said hollow bodies when connected to them, and means for actuating said stamps.

4. In a hydraulic cacao-press, movable hollow bodies for containing the charge of cacao, stamps operating in said hollow bodies to compress the cacao, means for maintaining said movable hollow bodies fixed, and means for operating said stamps relatively to said hollow bodies, and while said hollow bodies are fixed, the length of said stamps being sufficient, after full compression and after the said hollow bodies have been fixed, to push the press-cakes out of said hollow bodies, by further relative movement.

5. In a hydraulic cacao-press, a series of hollow bodies for containing the charge of cacao, and moving along a common axis, whereby they form a column, stamps operating in said hollow bodies to compress the cacao, means for first moving said hollow bodies and stamps in unison, means for then holding said hollow bodies stationary and moving the stamps relatively thereto, whereby the cacao is compressed, means for then backwardly moving said hollow bodies and stamps in unison, and means for then holding said hollow bodies stationary and moving said stamps forwardly and relatively thereto, whereby the press-cakes are pushed out of said hollow bodies.

6. In a hydraulic cacao-press, a main piston, an auxiliary piston, a series of movable hollow ring-shaped bodies for containing the charge of cacao, said hollow bodies being arranged along a common axis, a series of stamps intermediate said hollow bodies and arranged along the same common axis, means for connecting and disconnecting said hollow bodies to and from the adjacent stamps, a stationary head-piece, means actuated by said auxiliary piston for moving said hollow bodies and stamps in unison until they meet said head-piece, said main piston then operating to compress said column, means operated by said auxiliary piston for moving back said column of hollow bodies and stamps in unison, means for holding said hollow bodies stationary, and means operated by said auxiliary piston for then moving said stamps, after the disconnection thereof from said hollow bodies relatively to said hollow bodies, whereby the compressed contents of said hollow bodies are removed therefrom.

7. In a hydraulic cacao-press, the combination of ring-shaped hollow bodies arranged along a common axis and having side openings therein, movable stamps intermediate said ring-shaped bodies and arranged along the said common axis, valves for said openings, said valves having rigid means connected thereto to accurately limit their movement when closed, so that their interior surfaces, when closed, are maintained precisely flush with the interior surfaces of said cylindrical bodies.

8. In a hydraulic cacao-press, the combination of hollow ring-shaped bodies arranged along a common axis and having side openings therein, movable stamps intermediate said openings and arranged along the said common axis, disk valves for said openings, said valves being moved within said hollow bodies to clear said openings, and rigid means connected thereto to accurately limit their movement when closed, so that the interior surfaces of said valves, when closed, are precisely flush with the interior surfaces of said hollow bodies.

In testimony that I claim the foregoing as my invention, I have signed my name in presence of two subscribing witnesses.

PAUL THEODOR HÄNEL.

Witnesses:
 GUSTAV MÜLLER,
 L. A. BERGHOLZ.

Copies of this patent may be obtained for five cents each, by addressing the "Commissioner of Patents, Washington, D. C."